US012084324B1

(12) United States Patent
Huang et al.

(10) Patent No.: US 12,084,324 B1
(45) Date of Patent: Sep. 10, 2024

(54) ANGLE-ADJUSTABLE CROWBAR

(71) Applicant: Yongkang Huajie Industry Trade Co., Ltd., Yongkang (CN)

(72) Inventors: Huaming Huang, Yongkang (CN); Huang Xiaojie, Jinhua (CN)

(73) Assignee: Yongkang Huajie Industry Trade Co., Ltd.

( * ) Notice: Subject to any disclaimer, the term of this patent is extended or adjusted under 35 U.S.C. 154(b) by 0 days.

(21) Appl. No.: 18/122,724

(22) Filed: Mar. 17, 2023

(30) Foreign Application Priority Data

Oct. 21, 2022 (CN) ......................... 202222781122.1

(51) Int. Cl.
*B66F 15/00* (2006.01)
*B25D 1/04* (2006.01)
*B25D 1/06* (2006.01)
*B25G 1/06* (2006.01)

(52) U.S. Cl.
CPC .............. *B66F 15/00* (2013.01); *B25D 1/045* (2013.01); *B25D 1/06* (2013.01); *B25G 1/06* (2013.01); *B25D 2250/005* (2013.01)

(58) Field of Classification Search
CPC .... B25F 1/00; B25F 1/006; B25F 1/02; B25F 1/04; B66F 15/00; B25D 1/00; B25D 1/02; B25D 1/04; B25D 1/045; B25D 1/14; B25D 3/00; B25D 5/00; B25D 2250/005; B25D 2250/025; B25C 11/00
See application file for complete search history.

(56) References Cited

U.S. PATENT DOCUMENTS 7,520,199 B2 * 4/2009 Stawarski ................ B25G 1/06 81/58.3
7,628,382 B2 * 12/2009 Cole ....................... B25C 11/00 254/26 R
7,682,099 B2 * 3/2010 Cole ....................... B25G 1/06 81/58.3
7,735,172 B2 * 6/2010 Newton .................... B25F 1/00 7/166
8,342,482 B2 * 1/2013 Smith ..................... E04G 23/08 254/27

(Continued)

FOREIGN PATENT DOCUMENTS

CN 218145746 U * 12/2022

OTHER PUBLICATIONS

CN-218145746-U English Translation (Year: 2022).*

*Primary Examiner* — Makena S Markman
(74) *Attorney, Agent, or Firm* — Jose Cherson Weissbrot

(57) ABSTRACT

The present invention discloses an angle-adjustable crowbar that comprises a crowbar body and a crowbar head. The crowbar head includes a first hinge base and a second hinge base in a spaced manner, and a head of the crowbar body is rotatably mounted between the first hinge base and the second hinge base through an angle adjustment mechanism. The angle adjustment mechanism comprises a limit shaft penetrating through the first hinge base, the crowbar body and the second hinge base, a first tooth portion, a polygonal limit portion and a second tooth portion are sequentially disposed on an outer wall of the limit shaft in an axial direction. The angle-adjustable crowbar overcomes the defects that the limit strength of existing crowbars is weak, the tooth portion is unlikely to be damaged, and the crowbar head cannot be replaced.

9 Claims, 6 Drawing Sheets

(56) References Cited

U.S. PATENT DOCUMENTS

| | | | | |
|---|---|---|---|---|
| 8,763,225 | B2 * | 7/2014 | Bruce | B25B 27/02<br>29/270 |
| 2007/0158626 | A1 * | 7/2007 | Chang | B66F 15/00<br>254/25 |
| 2010/0186556 | A1 * | 7/2010 | Lin | B25B 13/06<br>81/125 |
| 2010/0314593 | A1 * | 12/2010 | Fan | A61P 35/00<br>254/25 |
| 2012/0261628 | A1 * | 10/2012 | Su | B66F 15/00<br>254/129 |
| 2016/0052117 | A1 * | 2/2016 | Cougar | B25G 1/102<br>254/26 R |
| 2019/0084817 | A1 * | 3/2019 | Zhang | B25C 11/00 |

* cited by examiner

ANGLE-ADJUSTABLE CROWBAR

BACKGROUND OF THE INVENTION

1. Technical Field

The invention relates to the field of hardware tools, in particular to an angle-adjustable crowbar.

2. Description of Related Art

A crowbar is an iron or steel bar used for prying, with one or two sharp ends, or one end shaped like a blade. The crowbar can also be used as a hoisting tool to help users lift a heavy object manually, thus having been widely used for lifting and transferring. The crowbar is also used for prying nails, opening wooden crates, and the like. Existing crowbars generally comprise a crowbar body and a crowbar head, wherein hinge bases are symmetrically disposed at one end of the crowbar head, and the crowbar body is rotatably mounted between the two hinge bases through an angle adjustment mechanism, such that the angle of the crowbar head is adjustable.

The existing angle adjustment mechanism comprises a limit shaft and a fastener riveted and fixed to the limit shaft, wherein a tooth portion is disposed on the limit shaft, and a tooth socket matched with the tooth portion is formed in each of the two hinge bases; when the tooth portion is clamped with the tooth sockets, the crowbar head is limited; when the tooth portion is separated from the tooth sockets, the crowbar head can rotate to adjust the angle. Such a structure has the following defects: (1) the limit shaft has only one limit position, so the limit strength is weak, and the tooth portion will be damaged in case of a large prying force; (2) the fastener is riveted and fixed to the limit shaft, so the crowbar head cannot be detached and cannot be changed as required; (3) the tooth portion is provided with 26 teeth at most, thus being prone to abrasion during use.

BRIEF SUMMARY OF THE INVENTION

(1) Technical Issue to be Settled

The technical issue to be settled by the invention is to provide an angle-adjustable crowbar to overcome the defects that the limit strength of existing crowbars is weak, the tooth portion is likely to be damaged, and the crowbar head cannot be replaced.

(2) Technical Solution

To settle the above technical issue, the invention provides an angle-adjustable crowbar, which comprises a crowbar body and a crowbar head, wherein a first hinge base and a second hinge base are disposed at an end of the crowbar head in a spaced manner, and a head of the crowbar body is rotatably mounted between the first hinge base and the second hinge base through an angle adjustment mechanism;

The angle adjustment mechanism comprises a limit shaft penetrating through the first hinge base, the crowbar body and the second hinge base, a first tooth portion, a polygonal limit portion and a second tooth portion are sequentially disposed on an outer wall of the limit shaft in an axial direction, a first tooth socket matched with the first tooth portion is formed in an inner wall of the first hinge base, a polygonal slot matched with the polygonal limit portion is formed in the crowbar body, and a second tooth socket matched with the second tooth portion is formed an inner wall of the second hinge base; and a fastener is connected to an end, close to the second tooth portion, of the limit shaft in a threaded manner, and is able to push the limit shaft to slide in the axial direction. According to the angle-adjustable crowbar, the first tooth portion, the polygonal limit portion and the second tooth portion are sequentially disposed on the limit shaft for limiting, such that the limit strength is effectively improved, the tooth portions are unlikely to be damaged, and the service life is prolonged; and the fastener is detachably connected to the limit shaft in a threaded manner, such that the crowbar head can be replaced with different crowbar heads as actually needed, the flexibility is better, and the application range is wider.

Further, the angle adjustment mechanism further comprises a spring mounted between the second hinge base and the fastener, and the fastener always has a trend to move outwards under the action of the spring; and in a normal state, the first tooth portion is clamped in the first tooth socket, the polygonal limit portion is clamped in the polygonal slot, and the second tooth portion in the second tooth socket.

Further, an annular flange is disposed in the second hinge base, and the second tooth socket is disposed in the annular flange; a sliding slot allowing the fastener to slide therein is formed in an outer side of the annular flange; and the spring has an end abutting against an outer wall of the annular flange, as well as an end abutting against the fastener.

Further, a tip diameter of the second tooth portion is less than an inscribed circle diameter of the polygonal limit portion, and a circumscribed circle diameter of the polygonal limit portion is less than a root diameter of the first tooth portion. The first tooth portion and the second tooth portion are each provided with 22 teeth, and the polygonal limit portion is octagonal.

Further, a threaded groove is formed in an end of the limit shaft, the fastener is a screw, a screw rod of the screw is connected into the threaded groove in a threaded manner, and a first internal hexagonal slot is formed in the screw.

Further, a second internal hexagonal slot is formed in an end of the limit shaft, and a first magnet is mounted in the second internal hexagonal slot and is used for attracting an external screwdriver.

Further, a flattened portion is disposed at a head end of the crowbar body and is rotatably connected to the crowbar head, and the polygonal slot is formed in the flattened portion.

Further, a hammer is disposed at a head end of the crowbar body, a T-groove is formed in an outer wall of the hammer, and a second magnet is mounted in the T-groove and is used for attracting an external nail; and a prying member is detachably mounted at a tail end of the crowbar body.

(3) Beneficial Effects

Compared with the prior art, the angle-adjustable crowbar provided by the invention has the following advantages:

(1) The first tooth portion, the polygonal limit portion and the second tooth portion are sequentially disposed on the limit shaft for limiting, and in the normal state, the first tooth portion is clamped in the first tooth socket, the polygonal limit portion is clamped in the polygonal slot, and the second tooth portion is clamped in the second tooth socket, such that the limit strength is effectively improved, the tooth portions are unlikely to be damaged, and the service life is prolonged;

(2) The fastener is detachably connected to the limit shaft in a threaded manner, such that the crowbar head can be replaced with different crowbar heads as actually needed, the flexibility is better, and the application range is wider;
(3) The first tooth portion and the second tooth portion are each provided with 22 teeth, such that abrasion can be reduced, and the service life is prolonged;
(4) The second internal hexagonal slot is formed in one end of the limit shaft, and a magnet is mounted in the second internal hexagonal slot and can be connected to an external screwdriver, and the crowbar can be used as a wrench to rotate the screwdriver, and the magnet attracts one end of the screwdriver, such that the screwdriver is unlikely to fall, and using is convenient;
(5) The hammer is arranged to realize a hitting function; the T-groove is formed in the hammer, a magnet is mounted in the T-groove and can attract an external nail, such that users can hit the nail with one hand, and operation is easier.

Figure 1:
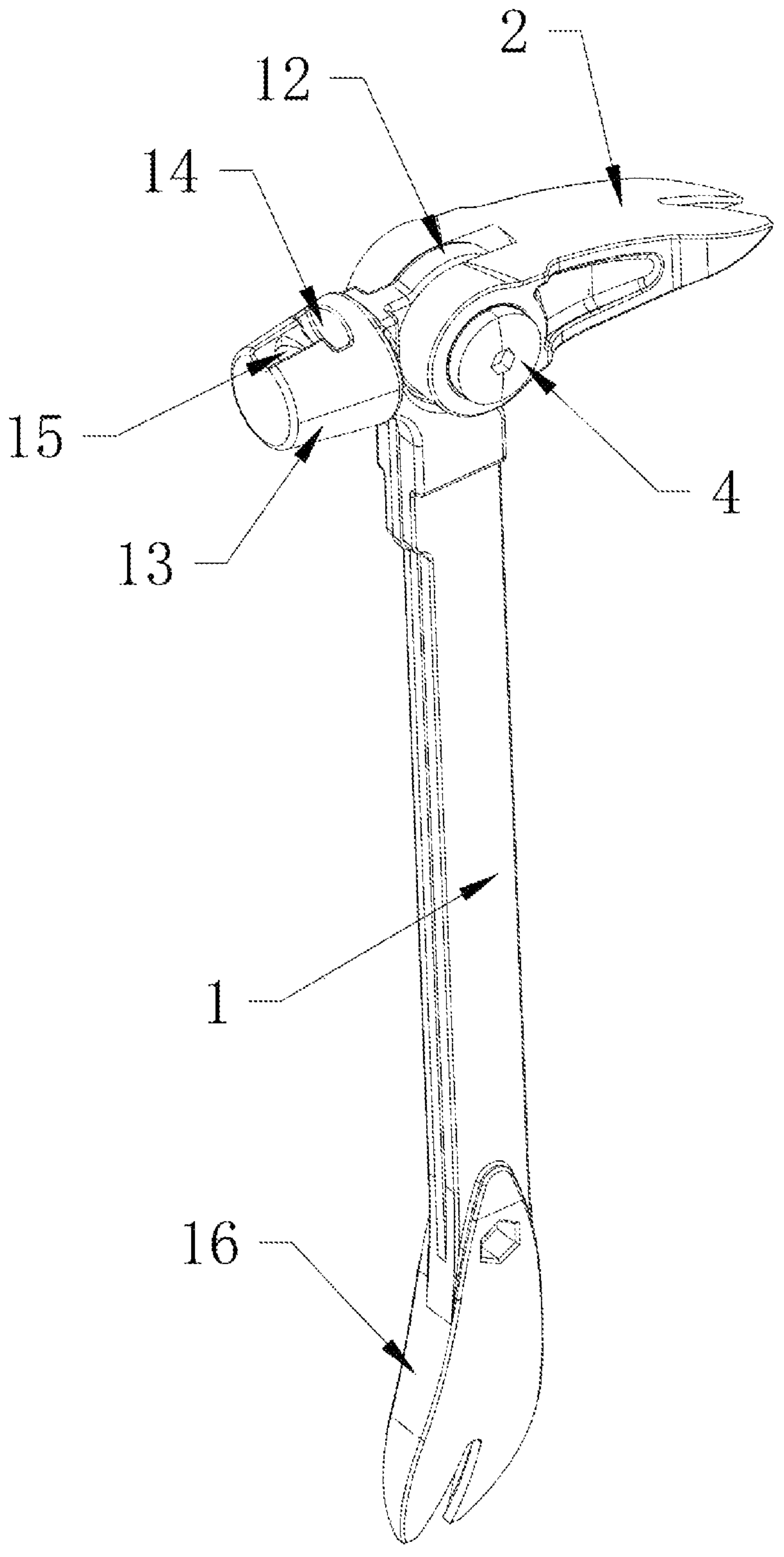
FIG. 1 is a three-dimensional view of an angle-adjustable crowbar according to the invention.

Components corresponding to reference signs in the figures: 1, crowbar body; 11, polygonal slot; 12, flattened portion; 13, hammer; 14, T-groove; 15, second magnet; 16, prying member; 2, crowbar head; 21, first hinge base; 22, second hinge base; 23, first tooth socket; 24, second tooth socket; 25, annular flange; 26, sliding slot; 3, limit shaft; 31, first tooth portion; 32, polygonal limit portion; 33, second tooth portion; 34, threaded groove; 35, second internal hexagonal slot; 36, first magnet; 4, fastener; 41, first internal hexagonal slot; 5, spring.

DETAILED DESCRIPTION OF THE INVENTION

The specific implementation of the invention will be described in further detail below in conjunction with the accompanying drawings and embodiments. The following embodiments are used to explain the invention, and are not used to limit the scope of the invention.

Referring to FIG. 1 to FIG. 7, the invention provides an angle-adjustable crowbar, which comprises a crowbar body 1 and a crowbar head 2, wherein a first hinge base 21 and a second hinge base 22 are disposed at an end of the crowbar head 2 in a spaced manner, and the first hinge base 21 and the second hinge base 22 are identical in structure and are integrated with the crowbar head 2.

Referring to FIG. 3 to FIG. 6, a head of the crowbar body 1 is rotatably mounted between the first hinge base 21 and the second hinge base 22 through an angle adjustment mechanism; the angle adjustment mechanism comprises a limit shaft 3 penetrating through the first hinge base 21, the crowbar body 1 and the second hinge base 22, a first tooth portion 31, a polygonal limit portion 32 and a second tooth portion 33 are sequentially disposed on an outer wall of the limit shaft 3 in an axial direction, a first tooth socket 23 matched with the first tooth portion 31 is formed in an inner wall of the first hinge base 21, a polygonal slot 11 matched with the polygonal limit portion 32 is formed in the crowbar body 1, and a second tooth socket 24 matched with the second tooth portion 33 is formed an inner wall of the second hinge base 22; and a fastener 4 is connected to an end, close to the second tooth portion 33, of the limit shaft 3 in a threaded manner, and is able to slide with respect to the second hinge base 22 and push the limit shaft 3 to slide in the axial direction.

Figure 4:
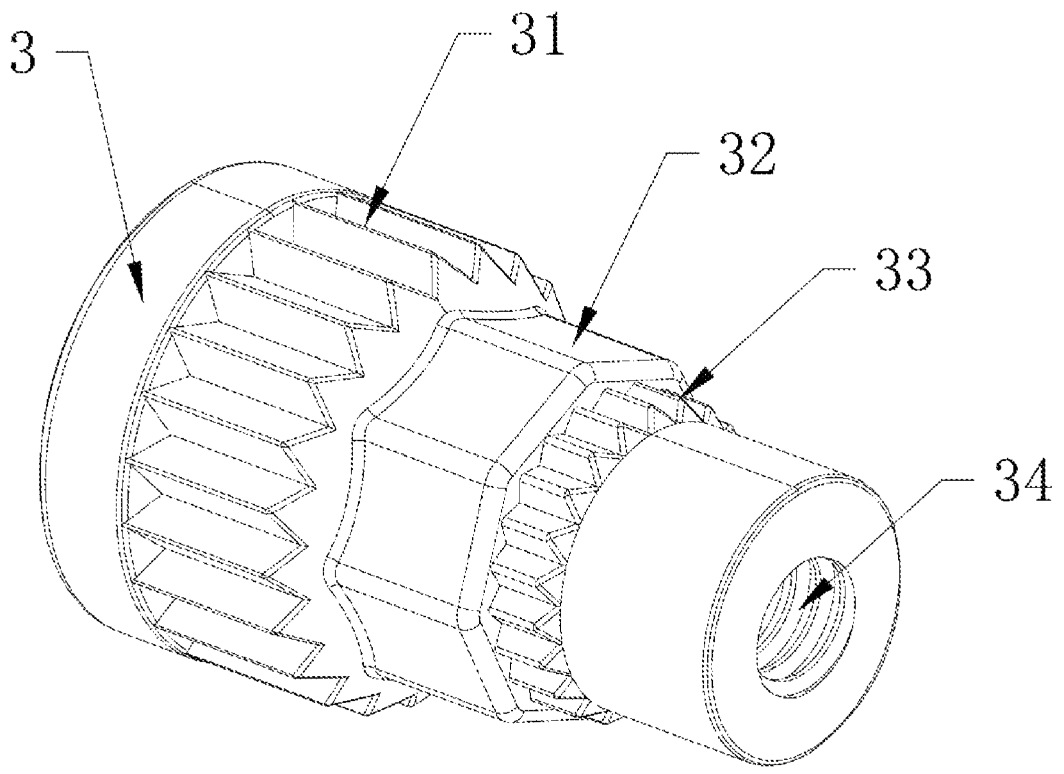
FIG. 4 is a three-dimensional view of a limit shaft of the angle-adjustable crowbar according to the invention.
Figure 6:
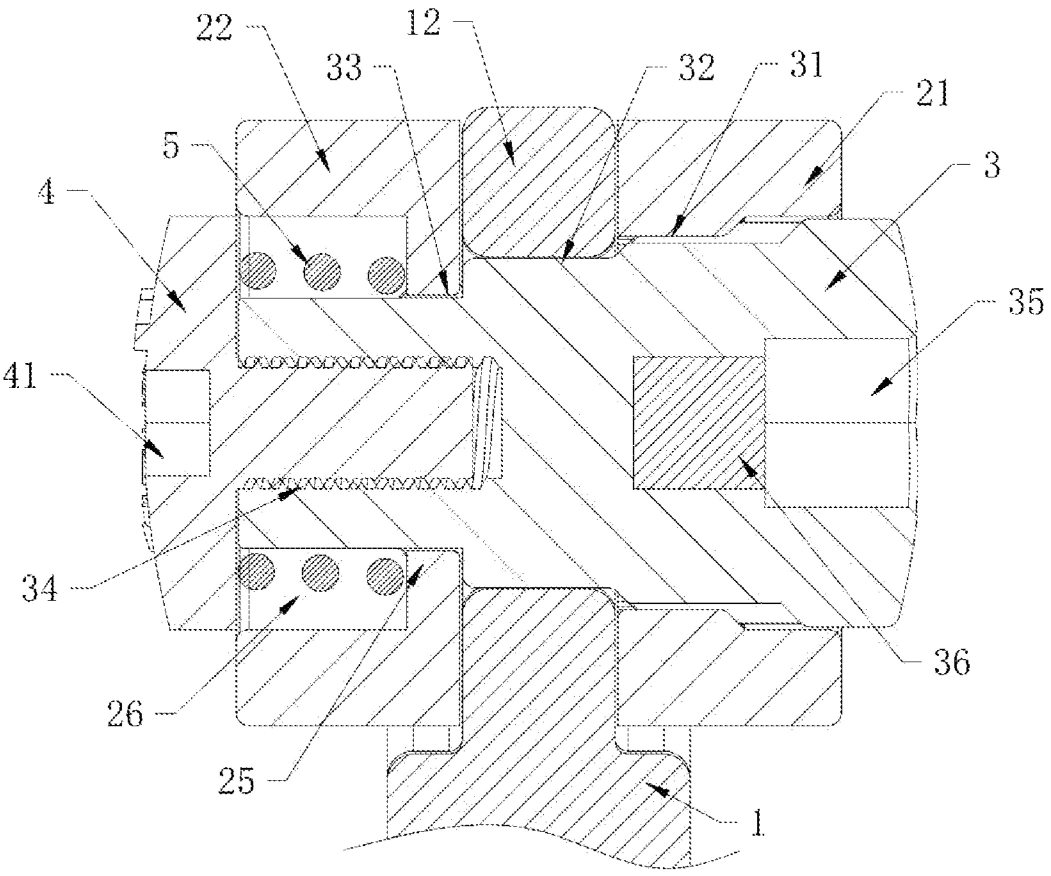
FIG. 6 is a structural view of an angle adjustment mechanism of the angle-adjustable crowbar in a normal state according to the invention.

Referring to FIG. 4 and FIG. 6, the angle adjustment mechanism further comprises a spring 5 mounted between the second hinge base 22 and the fastener 4, and the fastener 4 always has a trend to move outwards under the action of the spring 5; and in a normal state, the spring 5 enables the first tooth portion 31 to be clamped in the first tooth socket 23, the polygonal limit portion 32 to be clamped in the polygonal slot 11 and the second tooth portion 33 be clamped in the second tooth socket 24, correspondingly. When the pushing force applied to the fastener 4 disappears, the spring 5 enables the limit shaft 3 to return to be maintained in a clamped state.

Figure 5:
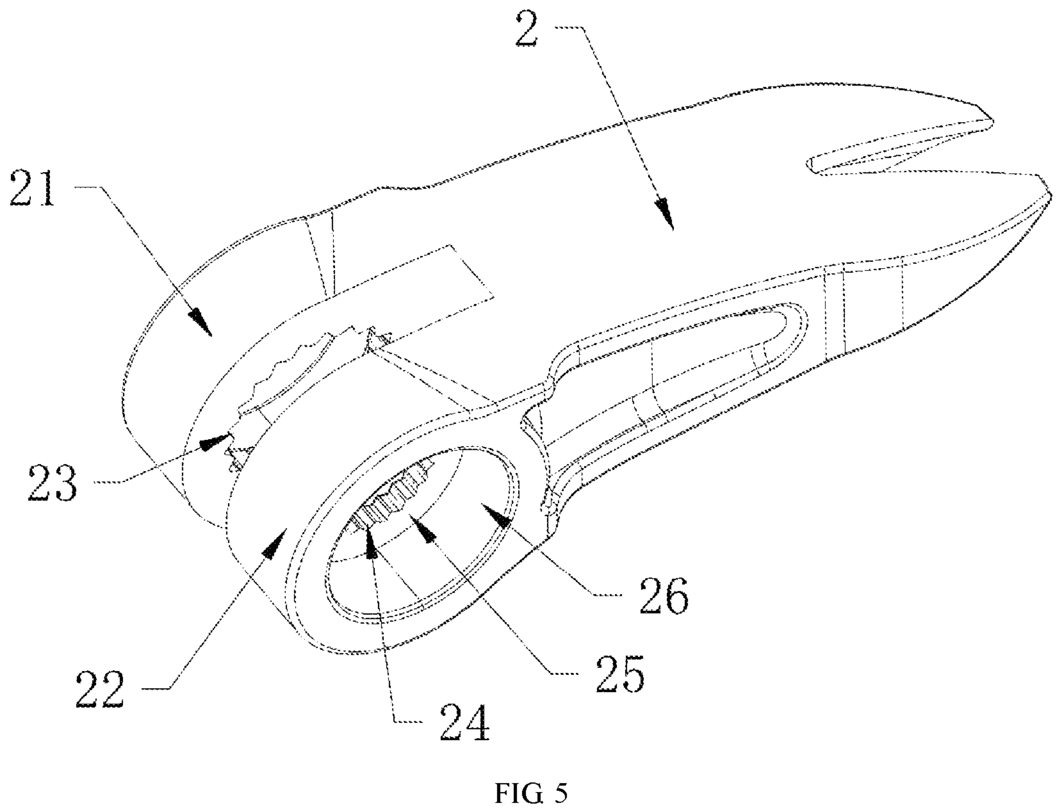
FIG. 5 is a three-dimensional view of a crowbar head of the angle-adjustable crowbar according to the invention.

Referring to FIG. 5 and FIG. 6, an annular flange 25 is disposed in the second hinge base 22, and the second tooth socket 24 is disposed in the annular flange 25; a sliding slot 26 allowing the fastener 4 to slide therein is formed in an outer side of the annular flange 25; and one end of the spring 5 abuts against an outer wall of the annular flange 25, and the other end of the spring 5 abuts against the fastener 4.

To guarantee the feasibility of the structure, a tip diameter of the second tooth portion 33 is less than an inscribed circle diameter of the polygonal limit portion 32, and a circumscribed circle diameter of the polygonal limit portion 32 is less than a root diameter of the first tooth portion 31. In this way, when the limit shaft 3 is pushed to slide in the axial direction, the second tooth portion 33 designates from the second tooth socket 24 to slide into the polygonal slot 11, and the polygonal limit portion 32 designates from the polygonal slot 11 to slide the first tooth socket 23, such that the crowbar head 2 can rotate to adjust the direction. Wherein, the first tooth portion 31 and the second tooth portion 33 are each provided with 22 teeth, such that abrasion of the tooth portions is reduced; and the polygonal limit portion 32 is octagonal.

As shown in FIG. 4 and FIG. 6, a threaded groove 34 is formed in one end of the limit shaft 3, the fastener 4 is a screw, a screw rod of the screw is connected into the threaded groove 34 in a threaded manner, a first internal hexagonal slot 41 is formed in the screw, and an internal hexagonal portion can be inserted into the first internal hexagonal slot 41 to disassemble the fastener 4, and then, the crowbar head is detached. A second internal hexagonal slot 35 is formed in one end of the limit shaft 3, and a first magnet 36 is mounted in the second internal hexagonal slot 35 and is used for attracting an external screwdriver. One end of the external screwdriver is an internal hexagonal portion, and the other end of the external screwdriver is a screwdriver portion. The internal hexagonal portion can be inserted into the second internal hexagonal slot 35 to be attracted by the first magnet 36, and the crowbar body 1 can be used as a wrench to rotate the screwdriver to remove the external screw, such that the functionality of the crowbar is improved.

Figure 2:
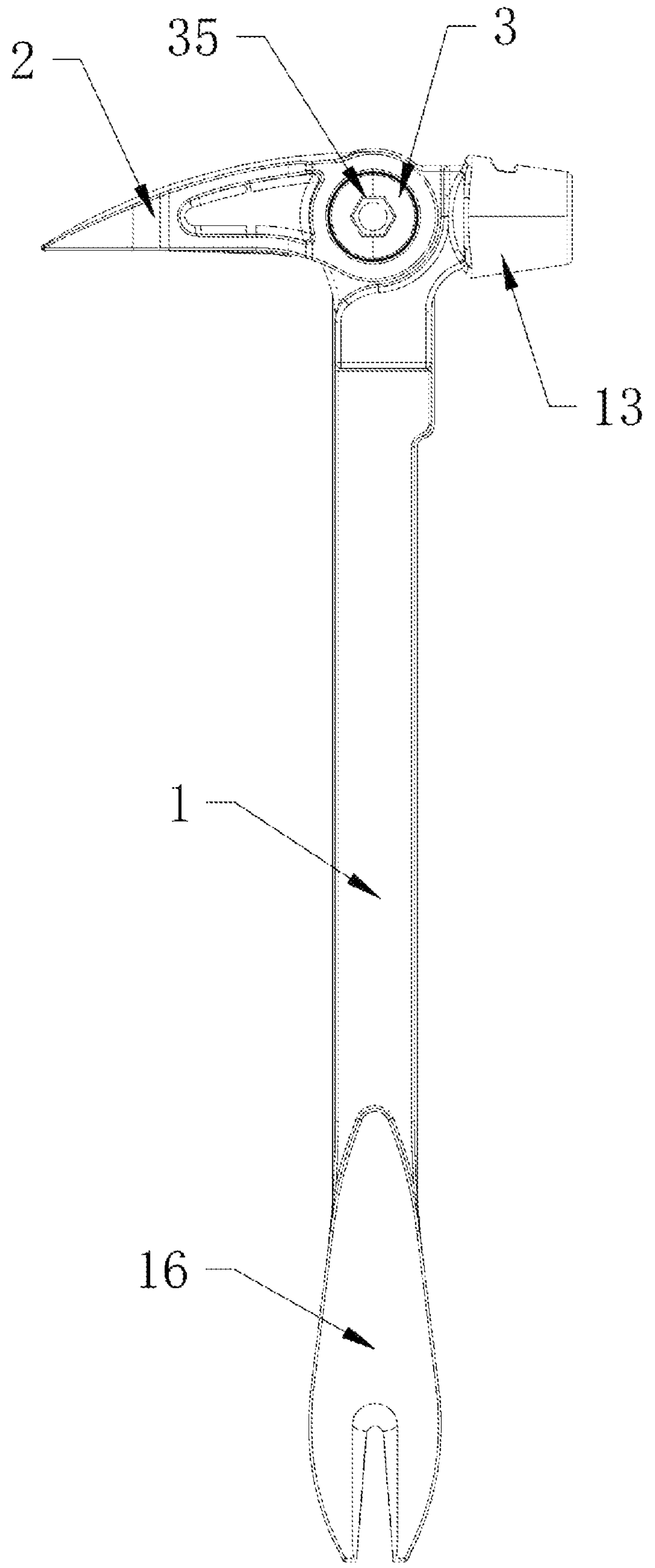
FIG. 2 is a structural view of the angle-adjustable crowbar according to the invention.
Figure 3:
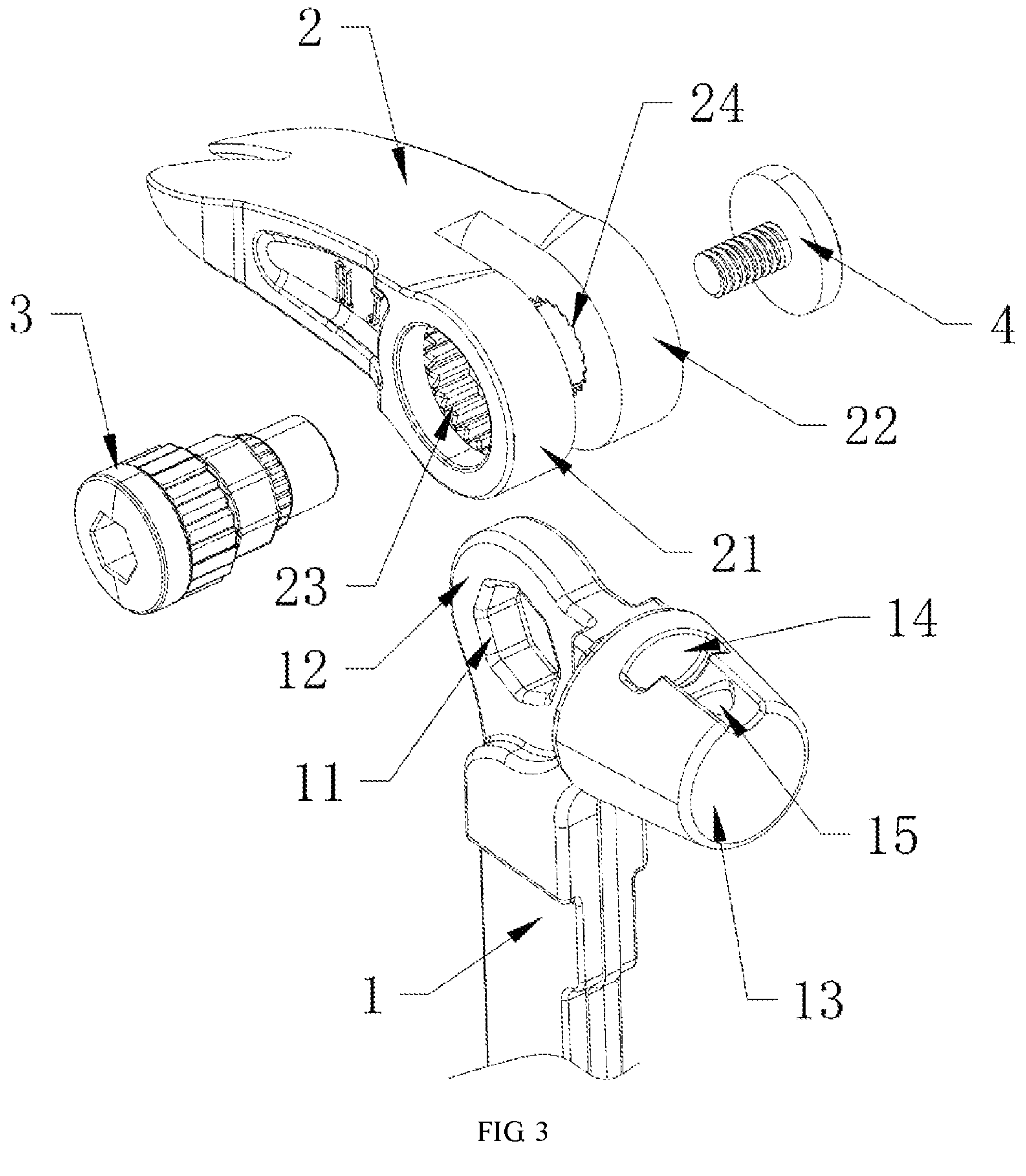
FIG. 3 is an exploded view of the angle-adjustable crowbar according to the invention.

Referring to FIG. 1 to FIG. 3, a flattened portion 12 is disposed at a head end of the crowbar body 1 and is rotatably connected to the crowbar head 2, and the polygonal slot 11 is formed in the flattened portion 12. A hammer 13 is disposed at the head end of the crowbar body 1, a T-groove 14 is formed in an outer wall of the hammer 13, and a second magnet 15 is mounted in the T-groove 14 and is used for attracting an external nail, such that users can hit the nail with one hand easily, and operation is more convenient; and a prying member 16 is detachably mounted at a tail end of the crowbar body 1, and the prying member 16 can be replaced, such that using is flexible.

Figure 7:
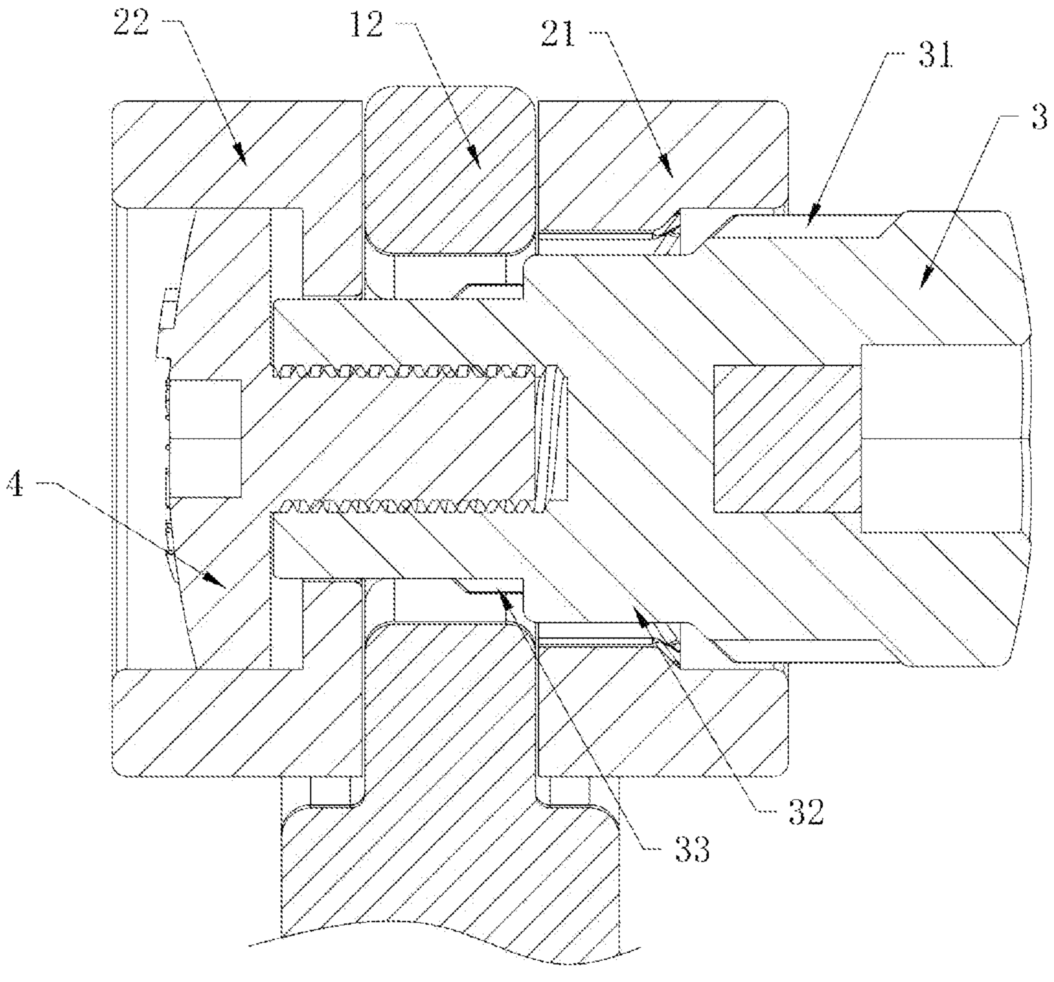
FIG. 7 is a structural view of the angle adjustment mechanism of the angle-adjustable crowbar during adjustment according to the invention.

Referring to FIG. 6 and FIG. 7, when the angle of the crowbar head 2 needs to be adjusted, users push the fastener 4 inwards with fingers, then the fastener 4 drives the limit shaft 3 to slide in the axial direction, and at this moment, the first tooth socket 31 designates from the first tooth socket 23 to slide outwards, the polygonal limit portion 32 designates from the polygonal slot 11 to slide into the first tooth socket 23, and the second tooth portion 33 designates from the second tooth socket 24 to slide into the polygonal slot 11, such that the crowbar head 2 can rotate to adjust the direction; and after the crowbar head 2 is adjusted, the fastener 4 is released, the fastener 4 and the limit shaft 3 return to the clamped state under the action of the spring.

According to the angle-adjustable crowbar provided by this embodiment, the first tooth portion, the polygonal limit portion and the second tooth portion are sequentially disposed on the limit shaft for limiting, and in the normal state, the first tooth portion is clamped in the first tooth socket, the polygonal limit portion is clamped in the polygonal slot, and the second tooth portion is clamped in the second tooth socket, such that the limit strength is effectively improved, the tooth portions are unlikely to be damaged, and the service life is prolonged; the fastener is detachably connected to the limit shaft in a threaded manner, such that the crowbar head can be replaced with different crowbar heads as actually needed, the flexibility is better, and the application range is wider; the first tooth portion and the second tooth portion 22 are each provided with 22 teeth, such that abrasion can be reduced, and the service life is prolonged; the second internal hexagonal slot is formed in one end of the limit shaft, and a magnet is mounted in the second internal hexagonal slot and can be connected to an external screwdriver, and the crowbar can be used as a wrench to rotate the screwdriver, and the magnet attracts one end of the screwdriver, such that the screwdriver is unlikely to fall, and using is convenient; the hammer is arranged to realize a hitting function; the T-groove is formed in the hammer, a magnet is mounted in the T-groove and can attract an external nail, such that users can hit the nail with one hand, and operation is easier.

The above embodiments are merely preferred ones of the invention. It should be pointed out that various improvements and embellishments can be made by those ordinarily skilled in the art without departing from the technical principle of the invention, and all these improvements and embellishments should also fall within the protection scope of the invention.

What is claimed is:

1. An angle-adjustable crowbar, comprising:

a crowbar body and a crowbar head, a first hinge base and a second hinge base being disposed at an end of the crowbar head in a spaced manner, wherein a head of the crowbar body is rotatably mounted between the first hinge base and the second hinge base through an angle adjustment mechanism;

the angle adjustment mechanism comprises a limit shaft penetrating through the first hinge base, the crowbar body and the second hinge base, the limit shaft comprises a first tooth portion, a polygonal limit portion and a second tooth portion sequentially disposed on an outer wall of the limit shaft in an axial direction of the limit shaft, wherein the limit shaft further comprises an end portion having a threaded groove, wherein a tip diameter of the second tooth portion is less than an inscribed circle diameter of the polygonal limit portion, and a circumscribed circle diameter of the polygonal limit portion is less than a root diameter of the first tooth portion, and wherein the second tooth portion lies between the polygonal limit portion and the end portion, and the tip diameter of the second tooth portion is greater than a diameter of the end portion, a first tooth socket matched with the first tooth portion is formed in an inner wall of the first hinge base, a polygonal slot matched with the polygonal limit portion is formed in the head of the crowbar body, and a second tooth socket matched with the second tooth portion is formed an inner wall of the second hinge base; and a fastener is connected to the end portion, close to the second tooth portion, of the limit shaft in a threaded manner, and is able to push the limit shaft to slide in the axial direction.

2. The angle-adjustable crowbar according to claim 1, wherein the angle adjustment mechanism further comprises a spring mounted between the second hinge base and the fastener, and the fastener is biased away from the end portion of the limit shaft under the action of the spring; and in a normal state, the first tooth portion is clamped in the first tooth socket, the polygonal limit portion is clamped in the polygonal slot, and the second tooth portion is clamped in the second tooth socket.

3. The angle-adjustable crowbar according to claim 2, wherein an annular flange is disposed in the second hinge base, and the second tooth socket is disposed in the annular flange;

a sliding slot allowing the fastener to slide therein is formed in an outer side of the annular flange; and the spring has an end abutting against an outer wall of the annular flange, as well as an opposite end abutting against the fastener.

4. The angle-adjustable crowbar according to claim 1, wherein the first tooth portion and the second tooth portion are each provided with 22 teeth, and the polygonal limit portion is octagonal.

5. The angle-adjustable crowbar according to claim 1, wherein the threaded groove is formed in the end portion of the limit shaft, the fastener is a screw, a screw rod of the screw is connected into the threaded groove in a threaded manner, and a first internal hexagonal slot is formed in the screw.

6. The angle-adjustable crowbar according to claim 1, wherein a second internal hexagonal slot is formed in an end of the limit shaft opposite the end portion, and a first magnet is mounted in the second internal hexagonal slot and is used for attracting an external screwdriver.

7. The angle-adjustable crowbar according to claim 1, wherein a flattened portion is disposed at the head of the crowbar body and is rotatably connected to the crowbar head, and the polygonal slot is formed in the flattened portion.

8. The angle-adjustable crowbar according to claim 1, wherein a hammer is disposed at the head of the crowbar body, a T-groove is formed in an outer wall of the hammer, and a second magnet is mounted in the T-groove and is used for attracting an external nail.

9. The angle-adjustable crowbar according to claim 1, wherein a prying member is detachably mounted at a tail end of the crowbar body.

* * * * *